US012465619B2

(12) United States Patent
Gallier et al.

(10) Patent No.: US 12,465,619 B2
(45) Date of Patent: Nov. 11, 2025

(54) USE OF POLAR LIPIDS TO TREAT OR PREVENT GESTATIONAL DIABETES MELLITUS

(71) Applicant: FONTERRA CO-OPERATIVE GROUP LIMITED, Auckland (NZ)

(72) Inventors: Sophie Yvette Fabienne Christine Gallier, Auckland (NZ); Angela Marie Rowan, Auckland (NZ); Philip Newton Baker, Auckland (NZ)

(73) Assignee: FONTERRA CO-OPERATIVE GROUP LIMITED, Auckland (NZ)

( * ) Notice: Subject to any disclaimer, the term of this patent is extended or adjusted under 35 U.S.C. 154(b) by 860 days.

(21) Appl. No.: 17/253,081

(22) PCT Filed: Jun. 24, 2019

(86) PCT No.: PCT/IB2019/055285
§ 371 (c)(1),
(2) Date: Dec. 16, 2020

(87) PCT Pub. No.: WO2019/244137
PCT Pub. Date: Dec. 26, 2019

(65) Prior Publication Data
US 2021/0113623 A1   Apr. 22, 2021

(30) Foreign Application Priority Data
Jun. 22, 2018   (NZ) .................................. 743704

(51) Int. Cl.
A61K 35/20   (2006.01)
A23C 9/123   (2006.01)
A23C 9/142   (2006.01)
A23C 9/152   (2006.01)
A23L 33/00   (2016.01)
A23L 33/115   (2016.01)
A23L 33/135   (2016.01)
A61K 35/747   (2015.01)

(52) U.S. Cl.
CPC ............ A61K 35/20 (2013.01); A23C 9/1232 (2013.01); A23C 9/142 (2013.01); A23C 9/1528 (2013.01); A23L 33/115 (2016.08); A23L 33/135 (2016.08); A23L 33/40 (2016.08); A61K 35/747 (2013.01)

(58) Field of Classification Search
None
See application file for complete search history.

(56) References Cited

U.S. PATENT DOCUMENTS

2003/0060509 A1   3/2003   Elswyk
2010/0068293 A1*  3/2010   Dalemans ............... A23C 13/12
                                                          426/74
2010/0331281 A1   12/2010  Moore et al.
2011/0177044 A1   7/2011   Thomas et al.
2016/0199331 A1   7/2016   Oosting et al.
2017/0000182 A1   1/2017   Huber-Haag et al.
2017/0007629 A1   1/2017   Kuang et al.

FOREIGN PATENT DOCUMENTS

| CN | 102894369 A | 1/2013 |
|---|---|---|
| CN | 104853619 A | 8/2015 |
| CN | 106604651 A | 4/2017 |
| CN | 107890115 | 4/2018 |
| EP | 2219652 | 4/2012 |
| WO | WO 2003/082921 | 10/2003 |
| WO | WO 2004/039430 | 5/2004 |
| WO | WO 2004/066744 | 8/2004 |
| WO | WO 2006/041316 | 4/2006 |
| WO | WO 2007/043900 | 4/2007 |
| WO | WO 2007/098564 | 9/2007 |
| WO | WO 2007/123424 | 11/2007 |
| WO | WO 2007/123425 | 11/2007 |
| WO | WO 2008/055296 | 5/2008 |
| WO | WO 2008/073448 | 6/2008 |
| WO | WO 2009/067182 | 5/2009 |
| WO | WO 2013/191542 | 12/2013 |
| WO | WO 2014/056025 | 4/2014 |
| WO | WO 2016/020489 | 2/2016 |
| WO | WO 2016/020495 | 2/2016 |
| WO | WO2016/050758 A1 | 4/2016 |
| WO | WO 2016/198528 | 12/2016 |
| WO | WO 2017/165287 | 9/2017 |
| WO | WO 2017/176199 A1 | 10/2017 |

OTHER PUBLICATIONS

Extended European Search Report issued in application No. 19823558.2 on Feb. 17, 2022.
Wickens et al., "Early pregnancy probiotic supplementation with Lactobacillus rhamnosus HN001 may reduce the prevalence of gestational diabetes mellitus: a randomised controlled trial", British Journal of Nutrition, 117:804-813 (2017).
Baker et al. Milk fat globule membrane as a source of gangliosides and phospholipids during pregnancy to support healthy pregnancy and birth outcomes, Journal of Pediatric Gastroenterology and Nutrition (Apr. 2018) vol. 66, Supplement 2 (Conference Abstract), p. 1047.
Huang et al. (2017) The CLIMB (Complex Lipids In Mothers and Babies) study: protocol for a multicentre, three-group, parallel randomised controlled trial to investigate the effect of supplementation of complex lipids in pregnancy, on maternal ganglioside status and subsequent cognitive outcomes in the offspring. BMJ Open;7:e016637. doi: 10.1136/bmjopen-2017-016637.

(Continued)

Primary Examiner — Russell G Fiebig
(74) Attorney, Agent, or Firm — KNOBBE, MARTENS, OLSON & BEAR, LLP

(57) ABSTRACT

Methods of treating or preventing gestational diabetes mellitus (GDM) and/or treating or preventing one or more GDM-associated risks or one or more sequelae of GDM by administering one or more polar lipids, in addition to uses, compositions, and medicaments comprising one or more polar lipids to treat or prevent gestational diabetes mellitus and/or treat or prevent one or more GDM-associated risks or one or more sequelae of GDM.

14 Claims, No Drawings

(56) References Cited

OTHER PUBLICATIONS

Albert et al (2021) Supplementation with milk enriched with complex lipids during pregnancy: A double-blind randomized controlled trial. PLoS One 16(2):e0244916. https://doi.org/10.1371/journal.pone.0244916.

Harper et al. (2021) Development of spatiotemporal land use regression models for PM2.5 and NO2 in Chongqing, China, and exposure assessment for the CLIMB study. Atmospheric Pollution Research 12(7):e101096. https://doi.org/10.1016/j.apr.2021.101096.

Zhang et al. (2020) Five serum fatty acids are associated with subclinical hypothyroidism in a Chinese pregnant population. Scientific Reports 10:e6743. https://doi.org/10.1038/s41598-020-63513-7.

Zhang et al. (2021) Complex patterns of circulating fatty acid levels in gestational diabetes mellitus subclasses across pregnancy. Clinical Nutrition 40(6):4140-4148.

Chen et al. (2021) Associations of early pregnancy BMI with adverse pregnancy outcomes and infant neurocognitive development. Scientific Reports 11:e3793. https://doi.org/10.1038/s41598-021-83430-7.

Ye et al. (2021) Neonatal Milk Fat Globule Membrane Supplementation During Breastfeeding Ameliorates the Deleterious Effects of Maternal High-Fat Diet on Metabolism and Modulates Gut Microbiota in Adult Mice Offspring in a Sex-Specific Way. Front. Cell. Infect. Microbiol. 11:621957.doi: 10.3389/fcimb.2021.621957.

Kanno C & Dong-Hyun K (1990) A simple procedure for the preparation of bovine milk fat globule membrane and a comparison of its composition, enzymatic activity, and electrophoretic properties with these prepared by other methods. Agric. Biol. Chem., 54(11):2845-2854.

Kanno C, Shimizu M & Yamachi K (1975) Isolation and physiochemical properties of a soluble glycoprotein fraction of milk fat globule membrane. Agric. Biol. Chem., 39(9):1835-1842.

Pruthi T D, Narayanan K M & Bhaleerao VR (1970) The role of milk phospholipids in the autoxidation of butterfat—I. Indian Journal of Dairy Science, 23:248-251.

Rombaut R, Camp JV, Dewettinck K. (2005) Analysis of phospho- and sphingolipids in dairy products by a new HPLC method. J Dairy Sci. 88(2), 482-8.

Rombaut R, Dejonckheere V, Dewettinck K., (2006) Microfiltration of butter serum upon casein micelle destabilization. J Dairy Sci. 89(6), 1915-25.

Rombaut R., Van Camp J. & Dewettinck K., (2006) Phospho- and sphingolipid distribution during processing of milk, butter and whey. International Journal of Food Science & Technology, 41(4):435-443.

Astaire J C, Ward R, German J B & Jimenez-Flores R (2003) Concentration of polar MFGM lipids from buttermilk by microfiltration and supercritical fluid extraction. J Dairy Sci. 86(7), 2297-307.

Boehm G and Moro G. Structural and Functional Aspects of Prebiotics Used in Infant Nutrition (2008) J. Nutr. 138(9), 1818S-1828S.

Lapolla et al. (2011) New International Association of the Diabetes and Pregnancy Study Groups (IADPSG) recommendations for diagnosing gestational diabetes compared with former criteria: a retrospective study on pregnancy outcome. Diabet Med. 28(9), 1074-7.

Diagnostic criteria and classification of hyperglycemia first detected in pregnancy: a World Health Organization Guideline. (2014) Diabetes Res. Clin. Pract. 103(3), 341-63.

McSweeney, Paul L. H et al. Advanced Dairy Chemistry, vol. 2: Lipids, vol. 2. pp. 19-27, 2020.

* cited by examiner

USE OF POLAR LIPIDS TO TREAT OR PREVENT GESTATIONAL DIABETES MELLITUS

REFERENCE TO RELATED APPLICATIONS

This application is the U.S. National Phase of International Application PCT/IB2019/055285, which is incorporated by reference herein. Any and all applications for which a foreign or domestic priority claim is identified in the Application Data Sheet as filed with the present application are hereby incorporated by reference under 37 C.F.R. § 1.57.

TECHNICAL FIELD

This invention relates to the use of polar lipids, in particular, polar lipids derived from milk, to treat or prevent gestational diabetes mellitus (GDM). Methods for using the polar lipids and compositions comprising the polar lipids are also provided.

BACKGROUND

Lifestyle factors such as changes in patterns of food consumption with economic development have led to the well-recognized and increasing problems of obesity and associated diseases, including gestational diabetes mellitus (GDM) both in New Zealand (NZ) and other developed countries.

Pre-pregnancy overweight and obesity have been shown to account for 46% of GDM with excess weight gain during pregnancy, previous GDM or a family history of diabetes, polycystic ovary syndrome (PCOS), older age and higher parity also identified as risk factors. GDM itself increases the risk of preeclampsia, miscarriage, preterm birth, macrosomia, induction of labour and caesarean section. GDM also increases the risk of later maternal and child obesity and subsequent type 2 diabetes mellitus. GDM-associated risks or sequelae of GDM in children whose birth mother suffered from GDM during their period in utero are, for example but not limited to, preterm birth, shoulder dystocia, macrosomia, congenital defects including impaired cognitive development, and neonatal complications such as hypoglycaemia, jaundice and respiratory distress, type 2 diabetes, cardiovascular disease, obesity and metabolic issues.

There is currently no international consensus on diagnostic criteria for GDM. One diagnostic criteria by the International Association of Diabetes and Pregnancy Study Group (IADPSG) is an oral glucose tolerance test threshold of ≥5.1 mmol/l (fasting plasma glucose), or post 75 g glucose level at 1 hour of ≥1.0 mmol/l or at 2 hours ≥8.5 mmol/l. The New Zealand Ministry of Health guideline definitions for GDM specify a higher baseline and 2 hour glucose test threshold (fasting plasma glucose≥5.5 mmol/l or 2 hours post 75 g glucose level≥9 mmol/l).

Current treatment or prevention of GDM is generally based on the maintenance of a healthy lifestyle in the subject. Prevention of GDM may include maintaining a healthy weight and blood sugar during pregnancy through diet restrictions and regular exercise. Treatment may also include daily blood glucose testing and insulin injections. Dietary counselling is another method currently used to prevent GDM.

There remains a need for methods and compositions useful to treat or prevent obesity and related diseases, in particular GDM. There is also a need for methods and compositions for treating or preventing GDM which does not rely changes in dietary modification and counselling. Methods and compositions for the prevention or amelioration of GDM-associated risks or sequelae of GDM are also desirable.

It is an object of this invention to provide improved or alternative methods and compositions for treating or preventing GDM and/or treating or preventing one or more GDM-associated risks or one or more sequelae of GDM.

SUMMARY OF THE INVENTION

In one aspect the invention relates to a method of treating or preventing GDM in a subject in need thereof, and/or treating or preventing one or more GDM-associated risks or one or more sequelae of GDM in a subject in need thereof, the method comprising administration of one or more polar lipids to the subject.

In another aspect the invention relates to a method of treating or preventing GDM in a subject in need thereof, the method comprising administration of one or more polar lipids to the subject.

In another aspect the invention relates to a method of treating or preventing one or more GDM-associated risks or one or more sequelae of GDM in a subject in need thereof, the method comprising administration of one or more polar lipids to the subject.

In another aspect the invention relates to a method of treating or preventing at least one GDM-associated risk or sequelae of GDM in a foetal, neonatal, infant or child subject, the method comprising administration of one or more polar lipids to the mother of the foetal, neonatal, infant or child subject in need thereof.

In another aspect the invention relates to one or more polar lipids for treating or preventing GDM, and/or for treating or preventing one or more GDM-associated risks or one or more sequelae of GDM.

In another aspect the invention relates to a composition comprising one or more polar lipids for treating or preventing GDM, or for treating or preventing one or more GDM-associated risks or one or more sequelae of GDM.

In another aspect the invention relates to use of one or more polar lipids in the manufacture of a composition or medicament for treating or preventing GDM, and/or for treating or preventing one or more GDM-associated risks or one or more sequelae of GDM.

In another aspect the invention relates to a method of lowering fasting mean blood glucose levels in a subject, the method comprising administering an effective amount of one or more polar lipids to a subject in need thereof.

In other aspects, the invention relates to use of compositions of the invention to reduce the risk of developing diabetes during pregnancy, reduce fasting blood sugar/glucose during pregnancy, reduce fasting blood glucose, maintain a normal blood sugar during pregnancy, and/or maintain normal blood glucose concentrations during pregnancy, and methods of achieving same.

Any of the following embodiments may relate to any of the above aspects, alone or in any combination.

In various embodiments, the one or more polar lipids may be administered in the form of a composition with a physiologically acceptable diluent, adjuvant, carrier or excipient.

In various embodiments, the physiologically acceptable diluent, adjuvant, carrier or excipient may be a nutritional composition. In one embodiment, the nutritional composition is cultured milk, yoghurt, cheese, ice cream, bar, milk drink or milk powder.

In various embodiments, the composition may be a pharmaceutical composition or supplement and said excipient or diluent is pharmaceutically acceptable diluent, adjuvant, carrier or excipient.

In various embodiments, the one or more polar lipids may be derived from non-human mammalian milk. In various embodiments, the one or more polar lipids may consist of or consist essentially of polar lipids derived from non-human mammalian milk. In various embodiments, the non-human mammalian milk may be sheep, goat, pig, mouse, water buffalo, camel, yak, horse, donkey, llama, or bovine milk. Preferred is bovine milk.

In various embodiments, the one or more polar lipids may comprise one or more phospholipids, one or more gangliosides, one or more ceramides, one or more cerebrocides, milk fat globule membrane (MFGM) material, or any combination of any two or more thereof. In various embodiments, the method may comprise administration of milk fat globule membrane material comprising the one or more polar lipids.

In various embodiments, the one or more gangliosides may comprise one or more glycosphingolipids, GD1, GD2, GD3, GM1, GM2, GM3, one or more monosialogangliosides, one or more disialogangliosides, or one or more polysialogangliosides, or any combination of any two or more thereof. In various embodiments, the one or more gangliosides may comprise GD3 or GM3, or a combination thereof.

In various embodiments, the one or more phospholipids may comprise one or more glycerolphospholipids, one or more phosphatidylcholines, one or more phosphatidylinositols, one or more phosphatidylserines, one or more phosphatidylethanolamines, one or more sphingomyelins, one or more dihydrosphingomyelins, one or more lysophospholipids, one or more phosphatidylglycerols, or any combination of any two or more thereof.

In various embodiments, at least about 60, 70, 80, 85, 90, 95, 99 or 100% of the fatty acids in the one or more phosphatidylcholines may be C14:0 or longer, each fatty acid optionally comprising one or more, two or more, three or more, or four or more double bonds in the main carbon chain of the fatty acid, and useful ranges may be selected between any of these values (for example, about 60 to about 100%). In various embodiments, the one or more phosphatidylcholines may be obtained solely from milk fat, preferably bovine milk fat. In various embodiments, the composition may comprise one or more phosphatidylcholines and one or more non-phosphatidylcholine polar lipids.

In various embodiments, the one or more lysophospholipids may comprise one or more lysophosphatidylcholines, one or more lysophosphatidylserines, one or more lysophosphatidylethanolamines, one or more lysophosphatidylinositols, or any combination of any two or more thereof. In various embodiments, the one or more sphingomyelins may comprise sphingomyelin, dihydrosphingomyelin, or a combination thereof. In various embodiments, the one or more glycerolphospholipids may comprise phosphatidylglycerol.

In various embodiments, the composition may comprise phosphatidic acid.

In various embodiments, the one or more polar lipids may be obtained solely from bovine milk fat.

In various embodiments, the composition may comprise at least about 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 25, 30, 35, 40, 45, 50, 55, 60, 65, or 70% by weight polar lipid, and useful ranges may be selected between any of these values (for example, about 0.01 to about 2, about 0.01 to about 5, about 0.01 to about 10, about 0.01 to about 15, about 0.01 to about 20, about 1 to about 5, about 1 to about 10, about 1 to about 15, about 1 to about 20, about 0.01 to about 70, or about 1 to about 70%).

In various embodiments, the composition may comprise at least about 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 25, 30, 35, 40, 45, 50, 55, 60, 65, or 70% by weight phospholipids, and useful ranges may be selected between any of these values (for example, about 0.01 to about 2, about 0.01 to about 5, about 0.01 to about 10, about 0.01 to about 15, about 0.01 to about 20, about 1 to about 5, about 1 to about 10, about 1 to about 15, about 1 to about 20, about 0.01 to about 70, or about 1 to about 70%).

In various embodiments, the composition may comprise at least about 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 25, 30, 35, 40, 45, 50, 55, 60, 65, or 70% by weight milk fat globule membrane material, and useful ranges may be selected between any of these values (for example, about 0.01 to about 2, about 0.01 to about 5, about 0.01 to about 10, about 0.01 to about 15, about 0.01 to about 20, about 1 to about 5, about 1 to about 10, about 1 to about 15, about 1 to about 20, about 0.01 to about 70, or about 1 to about 70%).

In various embodiments, the composition may comprise
  a) about 0.01 to about 0.5%, preferably about 0.02 to about 0.2% by weight of one or more phosphatidylcholines,
  b) about 0.005 to about 0.07%, preferably about 0.008 to about 0.05% by weight of one or more phosphatidylinositols,
  c) about 0.005 to about 0.07%, preferably about 0.008 to about 0.05% by weight of one or more phosphatidylserines,
  d) about 0.01 to about 0.5%, preferably about 0.02 to about 0.2% by weight of one or more phosphatidylethanolamines,
  e) about 0.01 to about 0.1%, preferably about 0.02 to about 0.08% by weight sphingomyelin,
  f) 0.001 to about 0.05%, preferably 0.001 to about 0.02% by weight dihydrosphingomyelin,
  g) any combination of any two or more of a) to f).

In various embodiments, the one or more polar lipids, or one or more phospholipids may comprise from about 0.01% to about 5% by weight of the total lipid in the composition.

In various embodiments, the total phospholipid in the composition may comprise
  a) about 20 to about 40%, preferably about 25 to about 30% by weight of one or more phosphatidylcholines,
  b) about 5 to about 20%, preferably about 7 to about 12% by weight of one or more phosphatidylinositols,
  c) about 5 to about 20%, preferably about 7 to about 12% by weight of one or more phosphatidylserines,
  d) about 15 to about 40%, preferably about 20 to about 30% by weight of one or more phosphatidylethanolamines,
  e) about 10 to about 30%, preferably about 15 to about 20% by weight sphingomyelin,
  f) about 0.5 to about 15%, preferably about 1 to about 5% by weight dihydrosphingomyelin, or g) any combination of any two or more of a) to f).

In various embodiments, the composition may comprise from about 2 to about 10 mg gangliosides per serve. In various embodiments, the composition may provide from about 2 to about 20 mg gangliosides per day.

In various embodiments, the composition may comprise from about 0.3 to about 6 mg gangliosides per gram of the composition.

In various embodiments, the composition may comprise from about 5 to about 35 mg per 100 g, preferably about 10 to about 20 mg per 100 g gangliosides. In various embodiments, the gangliosides may comprise 50-100% by weight GD3 and 1-60% GM3.

In various embodiments, the composition may comprise from about 0.1 to about 5 g phospholipids per serve. In various embodiments, the composition may provide from about 0.1 to about 10 g phospholipids per day.

In various embodiments, the method may comprise administering to the subject from about 0.1 to about 15 g of the one or more polar lipids per day.

In various embodiments, the method may comprise administering to the subject from about 2 to about 20 mg gangliosides per day.

In various embodiments, the method may comprise administering to the subject from about 0.1 to about 10 g phospholipids per day.

In various embodiments, where the subject is a foetal subject, the method of treating or preventing one or more GDM-associated risks or one or more sequelae of GDM may comprise administering the one or more polar lipids or a composition comprising the polar lipids to the foetal subject's mother. It will be appreciated that in such embodiments, the administration to the subject may be considered indirect administration. In various embodiments, the composition may be a maternal formula or a maternal supplement.

In various embodiments, where the subject is a neonatal, an infant, or a child subject, the method of treating or preventing one or more GDM-associated risks or one or more sequelae of GDM may comprise administering a composition comprising the one or more polar lipids to the subject. It will be appreciated that in such embodiments, the administration to the subject may be considered direct administration.

In various embodiments, such as where the subject is a breastfeeding neonatal, infant, or child subject, the method of treating or preventing one or more GDM-associated risks or one or more sequelae of GDM may comprise administering the one or more polar lipids or a composition comprising the one or more polar lipids to the subject's mother. It will be appreciated that in such embodiments, the administration to the subject may be considered indirect administration.

In various embodiments, the composition may be a formula, for example a maternal formula, infant formula, follow-on formula, growing-up formula or dietetic product, including hypoallergenic embodiments of such compositions.

In preferred embodiments where the subject is an adult subject, the method comprises administering a composition comprising the one or more polar lipids to the subject. Preferably, the composition is a supplement, or nutritional composition such as a formula, dietetic product or food. It will be understood that in such embodiments the subject is a woman, particularly a woman who has had one or more previous pregnancies, a pregnant woman, or a breast-feeding woman.

In various embodiments, the composition may be suitable for oral administration. In various embodiments, the composition may be suitable for parenteral administration. In various embodiments relating to preventing one or more GDM-associated risks or one or more sequelae of GDM in a foetal subject, the composition may be suitable for oral administration to a pregnant mother during gestation.

In various embodiments, the method may be a method of treating or preventing GDM in a subject having an increased risk of GDM. In one example, the method may be a method of treating or preventing GDM in a subject who has previously suffered GDM. In one example, the method may be a method of treating or preventing GDM in a subject over the age of 35 years, for example, a subject over the age of 35 years at conception. In another example, the method may be a method of treating or preventing GDM in a subject who has previously been pregnant.

In various embodiments, the subject may have a BMI of less than 25 or 30 kg/m2. In various embodiments, the subject may have a BMI of greater than 25 (overweight) or 30 (obese) kg/m2. In various embodiments, the subject may have high blood pressure. In various embodiments, the subject may have prediabetes. In various embodiments, the subject may be a woman, a woman who has had one or more previous pregnancies, a pregnant woman, or a breast-feeding woman.

In various embodiments, the method may be a method of preventing recurrence of GDM in a subject who has previously suffered from GDM, the method comprising administering an effective amount of one or more polar lipids to a subject in need thereof.

In various embodiments, the method may comprise beginning administration of the one or more polar lipids after the first trimester of pregnancy. In various embodiments, administration of the one or more polar lipids may begin at about 14 to about 16 week's gestation.

In various embodiments, such as in a method of lowering fasting mean blood glucose levels in a subject, the fasting mean blood glucose level may be below about 5.5 mmol/l, preferably about 4.35 mmol/l.

In various embodiments, treating or preventing the at least one GDM-associated risks or sequelae of GDM may comprise preventing or reducing one or more of the risks or sequalae disclosed herein, including excessive birth weight, preterm birth, unwanted induced labour, suboptimal APGAR score at birth, infant hypoglycaemia, and infant respiratory distress syndrome at birth. In this context, it should be understood that reducing the risk or sequalae may include a reduction in the risk of, a reduction in the incidence, and/or a reduction in the magnitude of the risk or of the sequalae.

In various embodiments, the composition may further comprise, or the method may further comprise separate, simultaneous, or sequential administration of, or the polar lipids may be used separately, simultaneously, or sequentially with, a probiotic or a killed or attenuated probiotic, or any combination of any two or more thereof. Preferably the probiotic is *Lactobacillus rhamnosus* HN001.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

DETAILED DESCRIPTION OF THE INVENTION

The present invention recognises for the first time the beneficial effects of administration of polar lipids, preferably polar lipids derived from milk, on the incidence and severity of GDM.

Accordingly, in a first aspect the invention provides a method of treating or preventing GDM in a subject, the method comprising administration of one or more polar lipids to a subject in need thereof.

In a further aspect, the invention also provides a method of treating or preventing GDM-associated risks or sequelae of GDM in a subject, the method comprising administration of polar lipids to a subject in need thereof. GDM-associated risks in a pregnant subject are, for example but not limited to high blood pressure, urinary tract infections, unwanted induced labour, caesarean birth, and increased risk of type-2 diabetes. GDM-associated risks or sequelae of GDM in a foetal, neonatal, infant, child or adult subject (in particular, subjects whose birth mother suffered from GDM during their period in utero) are, for example but not limited to excessive birth weight, suboptimal APGAR ("Appearance, Pulse, Grimace, Activity, and Respiration") score at birth, infant hypoglycaemia, preterm birth, shoulder dystocia, macrosomia, congenital defects including impaired cognitive development, and neonatal complications such as hypoglycaemia, jaundice and respiratory distress, type 2 diabetes, cardiovascular disease, obesity and metabolic issues.

While various routes and methods of administration are contemplated, oral administration of polar lipids, such as in a composition suitable for oral administration, is currently preferred. It will of course be appreciated that other routes and methods of administration may be utilised or preferred in certain circumstances.

The term "oral administration" includes oral, buccal, enteral and intra-gastric administration.

The term "parenteral administration" includes but is not limited to topical (including administration to any dermal, epidermal or mucosal surface), subcutaneous, intravenous, intraperitoneal, and intramuscular administration.

Unless indicated otherwise, where an amount is described in terms of percent (%) by weight or w/w, it should be understood that the amount represents the % by weight or w/w on a dry basis.

A "subject" is an animal, preferably a mammal, more preferably a mammalian companion animal or human. Preferred companion animals include cats, dogs and horses. In one embodiment the human is an adult, a child, an infant, a neonate, or a foetus. In various embodiments, the human child, infant or neonate is a breastfeeding child, infant or neonate. In various embodiments, the human adult is a woman, a woman who has had one or more previous pregnancies, a pregnant woman, or a breast-feeding woman.

As used herein, the term "therapeutic" and grammatical equivalents contemplate treatment, uses or administration where GDM or the symptoms of GDM are present.

The term "treat" and its derivatives should be interpreted in their broadest possible context. The term should not be taken to imply that a subject is treated until total recovery. Accordingly, "treat" broadly includes amelioration and/or prevention of the onset of the symptoms or severity of a particular condition.

It will be appreciated that the term "prophylactic" and grammatical equivalents as used herein contemplates treatment, use, administration and the like before GDM or the symptoms of GDM are apparent.

It will be appreciated that treatment includes prophylactic treatment, such as for example, the prophylactic treatment of a subject, such as a subject having an expected or established increased risk of GDM and/or a subject attempting to become or that is recently pregnant, or the prophylactic treatment of one or more GDM-associated risks or one or more sequelae of GDM in a foetal subject by indirect administration of a composition of the invention by administering the composition to the foetal subject's mother.

In another example, the prophylactic treatment of one or more GDM-associated risks or one or more sequelae of GDM is of a neonatal, infant or child subject by indirect administration of a composition of the invention by administering the composition to the subject's breastfeeding mother.

It will be further appreciated that treatment includes therapeutic treatment, such as for example, treatment of GDM or one or more symptoms of or risks associated with GDM, including for example the treatment of a neonatal, infant or child subject by indirect administration of a composition of the invention by administering the composition to the subject's mother.

It should be understood that a method useful herein may in various embodiments at least reduce the risk or severity of GDM or a sequalae of GDM in a subject.

Accordingly, the invention provides for a method of treating or preventing GDM in a pregnant subject, the method comprising administration of one or more polar lipids or a composition comprising one or more polar lipids to the pregnant subject.

In certain embodiments, the pregnant subject is older, for example 35 years or older.

In certain embodiments, the pregnant subject has a history of GDM.

In certain embodiments, the one or more polar lipids or a composition comprising one or more polar lipids is administered from 14 to 16 weeks gestation until delivery.

In certain embodiments, the one or more polar lipids or a composition comprising one or more polar lipids is administered from 14 to 16 weeks gestation to 6 months postpartum.

Accordingly, the invention provides a method of preventing one or more GDM-associated risks or one or more sequelae of GDM in a foetal subject, the method comprising administration of one or more polar lipids or a composition comprising one or more polar lipids to the subject's mother.

Also provided is a method of treating or preventing one or more GDM-associated risks or one or more sequelae of GDM in a neonatal, infant, or child subject, the method comprises administering one or more polar lipids or a composition comprising one or more polar lipids to the subject's mother.

A method of treating one or more GDM-associated risks or one or more sequelae of GDM in an infant or child subject comprising administering a composition consisting of or consisting essentially of one or more polar lipids is also contemplated.

In certain embodiments, the infant or child is one or more years of age.

In certain embodiments, the infant or child is a food-sensitised infant or child.

In certain embodiments, the infant or child is considered to be at risk of one or more GDM-associated risks or one or more sequelae of GDM due to the prior incidence of GDM in the infant or child's mother.

Polar Lipids and Methods to Obtain Polar Lipids

In various embodiments, one or more polar lipids for use in the invention may be derived from milk fat. Milk fat is discussed comprehensively by Fox and McSweeney (2006), hereby incorporated by reference. In addition to lipids, milk fat includes vitamins, sterols, and minor components. See Chapter 1, Composition and Structure of Bovine Milk Lipids, Fox and McSweeney, for a description of naturally occurring bovine milk fat. Fractionation of milk fat is discussed by Bylund, 1995, and by Illingworth, 2002, and by Rombaut et al, 2006(b), all hereby incorporated by reference. Seasonal variation of milk fat is discussed by Fox and McSweeney (2006).

Examples of milk fat fractions useful as a source of polar lipids for use in the invention include cream (typically about 20 to about 40% fat by weight, preferably about 40% fat by weight), whey cream, high fat whey, whey protein concentrate (WPC), high fat WPC, milk protein concentrate (MPC), high fat MPC, butter, ghee, by-products of anhydrous milk fat (AMF) production (typically produced by phase inversion of cream or dehydration of butter), buttermilk, butter serum, beta serum, sphingolipid fractions, milk fat globule membrane fractions, milk fat globule membrane lipid fractions, phospholipid fractions, and complex lipid (lipids that yield 3 or more types of hydrolysis product per molecule) fractions, and combinations thereof, and hydrolysates thereof.

Buttermilk, butter serum, and beta serum are discussed by Bylund, 1995, Rombaut et al, 2005, Rombaut et al, 2006(a), Rombaut et al, 2006(b), and published international application WO 2006/041316, for example, all incorporated herein by reference. Buttermilk is a term used to describe the aqueous liquid phase obtained from traditional butter production using a butter making process which may be a batch (churn) process or a continuous (Fritz) process. Buttermilk is also a term used to describe the aqueous by-product produced by the cream concentration step of the traditional method of producing AMF from cream. This traditional method involves concentration then phase inversion of cream to produce oil that is further concentrated and polished to produce AMF. Finally, buttermilk is also a term used to describe a combination of the secondary skim and beta serum by-products of a two-serum process for AMF, butter oil, or anhydrous butter oil production. In that two-serum process, the by-product from the cream concentration step is further separated to produce secondary skim and the by-product from the oil concentration step is further separated to produce beta serum. In the first two instances, the buttermilk is produced before any phase inversion has occurred. In the third instance, the buttermilk is a combination of secondary skim produced before phase inversion and beta serum produced after phase inversion. Concentration and polishing in these processes are typically achieved by centrifugation. Phase inversion is typically achieved by homogenisation. It should be understood that the source of these dairy lipid fractions may be milk or colostrum or a combination thereof.

Useful sources of polar lipids and starting materials for fractionation include cream, whey, whey cream, high fat whey, whey protein concentrate (WPC), high fat WPC, milk protein concentrate (MPC), high fat MPC, butter milk, butter serum, or beta serum, from milk or colostrum or a combination thereof. In various embodiments, these materials sources may be used directly to supply polar lipids or MFGM or fractionated to purify the polar lipid or MFGM component.

The term "beta serum" means an aqueous dairy ingredient separated from cream containing greater than 60% fat which has been through phase inversion from an oil-in-water to a water-in-oil emulsion. For example, beta serum is produced during the production of anhydrous milk fat (AMF), butter oil, or anhydrous butter oil from cream. Such a process comprises pasteurising cream comprising 40% lipid by weight, centrifugal separation of the pasteurised cream to remove a first aqueous phase and to generate an oil phase, phase inversion of the oil phase from an oil-in-water emulsion to a water-in-oil emulsion, centrifugal separation of the resulting emulsion to remove a second aqueous phase and to generate a lipid phase that is further processed into AMF or anhydrous butter oil, and centrifugal separation of the second aqueous phase to remove a lipid phase that is recycled into the main process prior to phase inversion, and to generate beta serum. Preferably the beta serum is dried and lactose-reduced; preferably dried beta serum is a powder.

The term "butter serum" means an aqueous dairy ingredient obtained from butter during the process of producing butter oil or anhydrous butter oil from butter. Preferably the butter serum is dried, and lactose reduced; preferably dried butter serum is a powder.

The terms "enrich" and "enriched" mean that the fraction or composition has a higher concentration of the named component than is present in whole milk, cream, butter, buttermilk, butter serum, whey, high fat whey protein concentrate, whey cream, or beta serum, or the parent fraction from which the fraction or composition is derived. For example, a ganglioside-enriched fraction is a fraction that has a higher ganglioside concentration than whole milk, cream, butter, anhydrous milk fat, buttermilk, butter serum, whey, high fat whey protein concentrate, whey cream, or beta serum. Equally, a phospholipid-enriched fraction is a fraction that has a higher phospholipid concentration than whole milk, cream, butter, anhydrous milk fat, buttermilk, butter serum, whey, high fat whey protein concentrate, whey cream, or beta serum.

The term "fraction" means a composition that has been isolated from a source material and that is compositionally different to the source material that the fraction was isolated from. For example, a non-human mammalian milk fat fraction, such as a sheep, goat, pig, mouse, water buffalo, camel, yak, horse, donkey, llama, or bovine milk fat fraction, preferably a bovine milk fat fraction, differs compositionally from the naturally occurring milk fat in whole milk. In alternative embodiments the concentration in the fraction is higher than the concentration in whole milk, or in whole colostrum, or in cream from milk, or in cream from colostrum. Preferred source material useful herein includes whole milk, cream, buttermilk, butter serum, beta serum, whey, whey cream, high fat whey, whey protein concentrate (WPC), high fat WPC, milk protein concentrate (MPC), or high fat MPC from bovine milk. Preferred fractions are lipid fractions, as described herein.

Accordingly, the term "phospholipid-enriched milk fat fraction" means an isolated fraction of non-human mammalian milk fat where the phospholipid concentration of the fraction is higher than the phospholipid concentration of naturally occurring non-human mammalian milk fat. Preferably the concentration of at least one phospholipid or at least one phospholipid and at least one ganglioside in a fraction useful herein is at least about 0.5, 1, 5, 10, 15, 20, 25, 30, 35, 40, 45, 50, 55, 60, 65, 70, 75, 80, 85, 90, 95, or 100% higher than the concentration in naturally occurring non-human mammalian milk fat, and useful ranges may be selected between these values. In alternative embodiments the concentration in the fraction is higher than the concentration in whole milk, or in whole colostrum, or in cream from milk, or in cream from colostrum, or in whey, casein, whey protein concentrate, or milk protein concentrate from milk or colostrum.

Equally, the term "ganglioside-enriched milk fat fraction" means an isolated fraction of non-human mammalian milk fat where the ganglioside concentration of the fraction is higher than the phospholipid concentration of naturally occurring non-human mammalian milk fat. Preferably the concentration of at least one ganglioside or at least one ganglioside and at least one phospholipid in a fraction useful herein is at least about 0.5, 1, 5, 10, 15, 20, 25, 30, 35, 40, 45, 50, 55, 60, 65, 70, 75, 80, 85, 90, 95, or 100% higher than the concentration in naturally occurring non-human mammalian milk fat, and useful ranges may be selected between these values. In alternative embodiments the concentration in the fraction is higher than the concentration in whole milk, or in whole colostrum, or in cream from milk, or in cream from colostrum, or in whey, casein, whey protein concentrate, or milk protein concentrate from milk or colostrum.

The term "milk fat" includes mammalian milk lipids and lipid fractions, lipid hydrolysates, and lipid fraction hydrolysates. In some embodiments, milk fat may be any mammalian milk fat including but not limited to bovine, sheep, goat, pig, mouse, water buffalo, camel, yak, horse, donkey, llama or human milk fat, with bovine milk fat being a preferred source. Preferred milk fats are dairy fats, particularly bovine milk fats. Preferred milk fat has one or more of palmitic acid, oleic acid, stearic acid, or myristic acid as the most abundant fatty acid(s) present, preferably palmitic, oleic, stearic and myristic acids are the most abundant fatty acids present. In particularly preferred embodiments, the milk fat, such as cream or AMF for example, has a) substantially the same percentage by weight of palmitic acid as does normal bovine milk fat (between about 23% (w/w) and about 32% (w/w), typically about 28% (w/w)—see Table 1.2, PF Fox and PLH McSweeney eds, Advanced Dairy Chemistry Volume 2—Lipids, 3rd Ed, Springer NY, N.Y. (2006) ISBN-10:0-387-26364-0); b) substantially the same percentage by weight of oleic acid as does normal bovine milk fat (between about 15% (w/w) and about 22% (w/w), typically about 17% (w/w)—see Fox and McSweeny ibid); c) substantially the same percentage by weight of stearic acid as does normal bovine milk fat (between about 10% (w/w) and about 15% (w/w), typically about 12% (w/w)—see Fox and McSweeny ibid); d) substantially the same percentage by weight of myristic acid as does normal bovine milk fat (between about 9% (w/w) and about 12% (w/w), typically about 11% (w/w)—see Fox and McSweeny ibid); e) any two of a), b), c), or d) above; f) any three of a), b), c), or d) above; g) each of a), b), c), and d) above. Preferred milk fat fractions also include cream, butter, butter milk, butter serum, beta serum, sphingolipid fractions (including sphingomyelin fractions, ceramide fractions, cerebroside fractions or ganglioside fractions, or any combination of any two or more thereof), milk fat globule membrane lipid fractions, phospholipid fractions, and complex lipid fractions, or any combination of any two or more thereof, and hydrolysates of any one or more thereof, and fractions of the hydrolysates, combinations of any two or more hydrolysates, and combinations of one or more hydrolysed and/or one or more non-hydrolysed fractions. Preferably, the milk fat comprises at least about 10, 20, 30, 40, 50, 60, 70, 80, 85, 90, 95, 99 or 100% lipid, and useful ranges may be selected between any of these values (for example, about 60 to about 100, about 70 to about 100, about 80 to about 100, about 85 to about 100, about 90 to about 100, about 95 to about 100, about 96 to about 100, about 97 to about 100, about 98 to about 100, and about 99 to about 100%, preferably about 40% or greater to about 100%).

Fractionation methods include phase inversion, interesterification, glycerolysis, solvent fractionation (such as with ethanol, water, or acetone, used alone or sequentially), supercritical fractionation (see Astaire, et al, 2003, for example), near critical fractionation (see WO 2004/066744, for example), distillation, centrifugal fractionation, suspension crystallisation, dry crystallisation, fractionation with a modifier (e.g. soaps or emulsifiers), ultra-filtration, micro-filtration, and any process for fractionation of lipid known in the art, and combinations of these methods, all as known in the art.

In various embodiments, the fractionation method is selected from solvent fractionation of cream, whey, whey cream, high fat whey, whey protein concentrate (WPC), high fat WPC, milk protein concentrate (MPC), high fat MPC, butter milk, butter serum, or beta serum, using ethanol, water, or acetone, alone or sequentially.

Polar lipids for use in the invention may be fully or partially modified, whether naturally, chemically, enzymatically, or by any other methods known in the art, including, for example, glycosylated, sialylated, esterified, phosphorylated or hydrolysed. Lipid hydrolysates may be prepared using known techniques, including but not limited to acid hydrolysis, base hydrolysis, enzymatic hydrolysis using a lipase, for example as described in Fox and McSweeney ((2006), Chapter 15 by H C Deeth and C H Fitz-Gerald), and microbial fermentation. One method of base hydrolysis includes adding 1% KOH (in ethanol) and heating for 10 minutes. Hydrolysed material may be neutralised with acetic acid or hydrochloric acid.

Milk fat globule membrane material may be isolated according to the acidification method of Kanno & Dong-Hyun, 1990, and further fractionated into lipid and protein fractions by the addition of methanol, as described by Kanno et al, 1975. A phospholipid fraction may be isolated by extracting the lipid mixture with acetone according to the procedure of Pruthi et al, 1970. Lipid residue may be further enriched in milk fat globule membrane lipids by the selective extraction of non-polar lipids with pentane.

Fractionation methods useful to produce milk fat fractions useful herein are also described in published international patent applications WO 2006/041316, WO 2007/123424, and WO 2007/123425 that are each hereby incorporated herein by reference in their entirety.

Particularly preferred milk fat fractions useful herein include those in the following tables. These fractions may be emulsions or dried, and may be powders, optionally with components including flow aids such as lactose added to improve flowability.

TABLE 1a

Phospholipid and ganglioside fractions

| Component (% w/w) | Fraction | | | | | |
|---|---|---|---|---|---|---|
|  | 1 | 2 | 3 | 4 | 5 | 6 |
| Protein | 30.2 | 49.7 | 60.2 | <0.01 | <0.01 | 12.4 |
| MFGM | 7.5 | 11.9 | 14.4 | 0.2 | ND | ND |
| Fat | 20.6 | 35.6 | 23.1 | 94.2 | 86.8 | 90.2 |
| Polar lipids |  |  |  |  |  |  |
| Phospholipid | 9.7 | 14.9 | 16.0 | 31.0 | 65.7 | 66.8 |
| PC | 2.5 | 3.8 | 4.9 | 8.1 | 16.8 | 15.0 |
| PI | 0.8 | 1.1 | 1.5 | 2.8 | 5.8 | 6.0 |
| PS | 1.1 | 1.6 | 2.1 | 4.3 | 8.7 | 7.6 |
| PE | 2.8 | 4.3 | 5.4 | 11.3 | 23.6 | 21.8 |
| SM | 2.4 | 3.6 | 4.5 | 7.5 | 16.5 | 13.6 |
| Gangliosides | 0.4 | 0.7 | 1.0 | 1.2 | 2.0 | 2.0 |
| GD3 | 0.4 | 0.6 | 0.9 | 1.1 | 1.8 | 1.8 |
| Lactose | ND | 7.8 | 11.7 | 2.6 | 6.4 | 4.0 |
| Ash | ND | 5.2 | 5.9 | 3.1 | 12.1 | 9.1 |
| Moisture | 1.9 | 2.7 | 2.9 | 2.6 | 4.6 | 2.3 |

ND = not determined;
<0.01 = trace amounts

TABLE 1b

Phospholipid and ganglioside fractions

| Component (% w/w) | Fraction | | | | | |
|---|---|---|---|---|---|---|
|  | 7 | 8 | 9 | 10 | 11 | 12 |
| Protein | 0.0 | 0.0 | ND | <2% | 10.2 | 72 |
| MFGM | 0.0 | 0.0 | ND | ND | ND | 6.5 |
| Fat | 87.0 | 84.4 | 84.6 | 35.5 | 27.9 | 17 |
| Polar lipids |  |  |  |  |  |  |
| Phospholipid | 24.7 | 60.2 | 27.6 | 17.6 | 15.1 | 6.3 |
| PC | 8.0 | 19.2 | 3.2 | 3.1 | 2.0 | 1.7 |
| PI | 0.7 | 2.0 | 6.0 | 2.8 | 2.9 | 0.5 |
| PS | 1.0 | 2.4 | 7.3 | 3.5 | 4.0 | 0.8 |
| PE | 7.7 | 17.0 | 6.4 | 4.9 | 4.4 | 1.7 |
| SM | 6.9 | 16.7 | 3.5 | 2.8 | 1.6 | 1.6 |
| Gangliosides | 0.0 | 0.0 | 4.5 | 1.3 | 2.0 | 0.3 |
| GD3 | 0.0 | 0.0 | 4.0 | 0.6 | 1.8 | 0.3 |
| Lactose | 4.1 | 6.2 | 8.3 | 54.9 | 58.0 | ND |
| Ash | 13.3 | 7.4 | 7.0 | 5.0 | 8.3 | ND |
| Moisture | 2.2 | 2.0 | 3.7 | 3.2 | 2.8 | ND |

ND = not determined;
<0.01 = trace amounts

In one embodiment the one or more polar lipids is administered as a component of a lipid composition. Preferred lipid compositions include animal, plant and marine oils, and fats and lipids produced by fermentation with microorganisms. Preferred animal fats include but are not limited to dairy fats, particularly bovine milk fat, including cream. Alternative animal lipid compositions include egg, particularly egg yolk and polar lipid fractions of egg yolk. Preferred plant lipid compositions include sunflower oil, soybean oil and polar lipid fractions of sunflower oil or soybean oil, or any combination of any two or more thereof.

In one embodiment the lipid composition is selected from cream, butter, ghee, a by-product of anhydrous milk fat (AMF) production (typically produced by phase inversion of cream or dehydration of butter), buttermilk, butter serum, beta serum, sphingolipid fractions, milk fat globule (or "globular) membrane lipid-enriched fractions (including, for example, sphingolipids, ceramides, and cerebrocides), phospholipid fractions, and complex lipid fractions, CLA-enriched milk fat, CLA-enriched milk fat fractions, and any combinations of any two or more thereof, and hydrolysates thereof, and fractions of the hydrolysates, and combinations of hydrolysed and/or non-hydrolysed fractions. These fractions may be obtained from whole milk or colostrum, and any derivatives of whole milk or colostrum, including cream, cultured cream, and whey, whey cream (milk lipid obtained from whey, including acid whey or cheese whey, preferably cheese whey), high fat whey, whey protein concentrate (WPC), high fat WPC, milk protein concentrate (MPC), or high fat MPC. Cultured cream is cream from whole milk or colostrum that has been fermented with acid-producing microorganisms, preferably lactic acid bacteria.

In one embodiment the milk fat or fraction thereof is selected from cream, butter, ghee, whey, whey cream, high fat whey, whey protein concentrate (WPC), high fat WPC, milk protein concentrate (MPC), high fat MPC, a by-product of anhydrous milk fat (AMF) production (typically produced by phase inversion of cream or dehydration of butter), buttermilk, butter serum, or beta serum, and any combination of any two or more thereof.

In one embodiment the lipid composition comprises a phospholipid-enriched fraction selected from buttermilk, one or more buttermilk fractions, butter serum, one or more butter serum fractions, beta serum, one or more beta serum fractions, one or more sphingolipid fractions, one or more milk fat globule membrane lipid fractions, one or more phospholipid fractions, one or more complex lipid fractions, phospholipid-enriched whey, phospholipid-enriched whey cream, phospholipid-enriched high fat whey, phospholipid-enriched whey protein concentrate (WPC), phospholipid-enriched high fat WPC, phospholipid-enriched milk protein concentrate (MPC), phospholipid-enriched high fat MPC, and any combination of any two or more thereof.

In one embodiment the lipid composition comprises a ganglioside-enriched fraction selected from buttermilk, one or more buttermilk fractions, butter serum, one or more butter serum fractions, beta serum, one or more beta serum fractions, one or more GD3-enriched fractions of beta serum, one or more GM3-enriched fractions of beta serum, one or more GD3- and GM3-enriched fractions of beta serum, ganglioside-enriched whey, ganglioside-enriched whey cream, ganglioside-enriched high fat whey, ganglioside-enriched whey protein concentrate (WPC), ganglioside-enriched high fat WPC, ganglioside-enriched milk protein concentrate (MPC), ganglioside-enriched high fat MPC, and any combination of any two or more thereof.

In some embodiments the fraction comprises
a) about 5 to about 100% w/w lipid, or
b) about 40 to about 100% w/w lipid, or
c) about 5 to about 95% w/w lipid and about 0 to about 75% w/w protein, or
d) about 15 to about 95% w/w lipid and about 0 to about 75% w/w protein, or
e) about 5 to about 95% w/w lipid, about 0 to about 75% w/w protein, about 5 to about 85% w/w phospholipids and about 0 to about 5% w/w ganglioside, or
f) about 15 to about 95% w/w lipid, about 0 to about 65% w/w protein, about 5 to about 70% w/w phospholipids and about 0 to about 2.5% w/w ganglioside.

In some embodiments the fraction comprises at least about 0.5, 1, 2, 3, 4, 5, 10, 15, 20, 25, 30, 35, 40, 45, 50, 55, 60, 65, 70, 75, 80, 85, 90 or 95% w/w of one or more phospholipid, and useful ranges may be selected between any of these values (for example, about 0.5 to about 95%, about 0.5 to about 10%, about 5 to about 95%, about 10 to about 95%, about 15 to about 95%, about 20 to about 95%, about 25 to about 95%, about 30 to about 95%, about 35 to about 95%, about 40 to about 95%, about 45 to about 95%, about 50 to about 95%, about 10 to about 70%, about 15 to about 70%, about 20 to about 70%, about 25 to about 70%, about 30 to about 70%, about 35 to about 70%, about 40 to about 70%, about 45 to about 70%, and about 50 to about 70% w/w phospholipid).

In some embodiments the fraction comprises at least about 0.1, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30% w/w of one or more phospholipids selected independently from phosphatidylcholine, phosphatidylethanolamine, sphingomyelin, phosphatidylserine, and phosphatidylinositol, and useful ranges may be selected between any of these values (for example, about 0.1 to about 30%, about 0.5 to about 30%, about 1 to about 30%, about 2 to about 30%, about 3 to about 30%, about 4 to about 30%, about 5 to about 30%, about 10 to about 30%, about 15 to about 30%, about 20 to about 30%, about 0.1 to about 5%, about 0.5 to about 5%, about 1 to about 5%, about 2 to about 5%, about 3 to about 5%, about 0.1 to about 10%, about 0.5 to about 10%, about 1 to about 10%, about 2 to about 10%, about 3 to about 10%, about 4 to about 10%, about 5 to about 10%, about 6 to about 10%, about 0.1 to about 20%, about 0.5 to about 20%, about 1 to about 20%, about 2 to about 20%, about 3 to about 20%, about 4 to about 20%, about 5 to about 20%, about 10 to about 20%, about 15 to about 20% w/w of one or more phospholipids selected independently from phosphatidylcholine, phosphatidylethanolamine, sphingomyelin, phosphatidylserine, and phosphatidylinositol).

In some embodiments the fraction comprises at least about 0, 1, 2, 3, 4, 5, 6, 7, 8, 9, 10, 11, 12, 13, 14, or 15% w/w of one or more gangliosides, and useful ranges may be selected between any of these values (for example, about 0 to about 10%, about 0 to about 15%, about 1 to about 10%, or about 1 to about 15%).

In some embodiments the fraction comprises
a) about 25 to about 35% w/w protein, about 15 to about 25% w/w lipid, and about 5 to about 12% w/w phospholipid, or
b) about 25 to about 35% w/w protein, about 15 to about 25% w/w lipid, about 5 to about 12% w/w phospholipid, about 5 to about 10% w/w MFGM protein, and about 0.2 to about 0.9% w/w ganglioside, or
c) about 25 to about 35% w/w protein, about 15 to about 25% w/w lipid, about 5 to about 12% w/w phospholipid, about 1 to about 5% w/w phosphatidylcholine, about 1.5 to about 6% w/w phosphatidylethanolamine, about 1 to about 5% w/w sphingomyelin, about 0.5 to about 2% w/w phosphatidylserine, about 0.1 to 2% w/w phosphatidylinositol, about 5 to about 10% w/w MFGM protein, and about 0.2 to about 0.9% w/w ganglioside, or
d) about 40 to about 60% w/w protein, about 25 to about 45% w/w lipid, and about 10 to about 25% w/w phospholipid, or
e) about 40 to about 60% w/w protein, about 25 to about 45% w/w lipid, about 10 to about 25% w/w phospholipid, about 5 to about 20% w/w MFGM protein, and about 0.5 to about 2.0% w/w ganglioside, or
f) about 46 to about 52% w/w protein, about 28 to about 40% w/w lipid, about 11 to about 16% w/w phospholipid, about 2 to about 6% w/w phosphatidylcholine, about 3 to about 8% w/w phosphatidylethanolamine, about 2.5 to about 7% w/w sphingomyelin, about 0.5 to about 3% w/w phosphatidylserine, about 0.5 to 2% w/w phosphatidylinositol, about 5 to about 15% w/w MFGM protein, and about 0.5 to about 0.9% w/w ganglioside, or
g) about 50 to about 70% w/w protein, about 12 to about 32% w/w lipid, and about 5 to about 25% w/w phospholipid, or
h) about 50 to about 70% w/w protein, about 12 to about 32% w/w lipid, about 5 to about 25% w/w phospholipid, about 2 to about 8% w/w phosphatidylcholine, about 2 to about 10% w/w phosphatidylethanolamine, about 2 to about 8% w/w sphingomyelin, and about 1 to about 3% w/w phosphatidylserine, about 10 to about 20% w/w MFGM protein, and about 0.5 to about 2.5% w/w ganglioside, or
i) about 56 to about 65% w/w protein, about 18 to about 28% w/w lipid, about 8 to about 20% w/w phospholipid, about 2 to about 8% w/w phosphatidylcholine, about 2 to about 10% w/w phosphatidylethanolamine, about 2 to about 8% w/w sphingomyelin, and about 1 to about 3% w/w phosphatidylserine, and about 0.5 to 3% w/w phosphatidylinositol, about 10 to about 20% w/w MFGM protein, and about 0.5 to about 2.5% w/w ganglioside, or
j) about 0 to about 10% w/w protein, about 85 to about 97% w/w lipid, and about 25 to about 35% w/w phospholipid, or
k) about 0 to about 10% w/w protein, about 85 to about 97% w/w lipid, about 25 to about 35% w/w phospholipid, about 5 to about 10% w/w phosphatidylcholine, about 7 to about 13% w/w phosphatidylethanolamine, about 4 to about 9% w/w sphingomyelin, about 2 to about 5% w/w phosphatidylserine, about 1 to about 3% w/w phosphatidylinositol, about 0 to about 5% w/w MFGM protein, and about 1 to about 3% w/w gangliosides, or
l) about 10 to about 15% w/w protein, about 80 to about 95% w/w lipid, and about 60 to about 80% w/w phospholipid, or
m) about 10 to about 15% w/w protein, about 80 to about 95% w/w lipid, about 60 to about 80% w/w phospholipid, about 10 to about 20% w/w phosphatidylcholine, about 18 to about 28% w/w phosphatidylethanolamine, about 10 to about 20% w/w sphingomyelin, about 4 to about 12% w/w phosphatidylserine, about 2 to about 10% w/w phosphatidylinositol, about 0 to about 5% w/w MFGM protein, and about 1 to about 5% w/w gangliosides, or n) about 75 to about 99% w/w lipid and about 15 to 35% w/w phospholipid, or
o) about 80 to about 90% w/w lipid, about 5 to about 15% w/w phosphatidylcholine, about 5 to about 15% w/w phosphatidylethanolamine, about 4 to about 10% w/w sphingomyelin, and about 0.1 to about 2% w/w phosphatidylserine, or
p) about 80 to about 90% w/w lipid, about 20 to 30% w/w phospholipid, about 5 to about 15% w/w phosphatidylcholine, about 5 to about 15% w/w phosphatidylethanolamine, about 5 to about 10% w/w sphingomyelin, about 0.5 to about 1.5% w/w phosphatidylserine, and about 0.1 to about 1.2% w/w phosphatidylinositol, or
q) about 75 to about 95% w/w lipid and about 50 to about 90% w/w phospholipid, or
r) about 80 to about 90% w/w lipid, about 10 to about 30% w/w phosphatidylcholine, about 12 to about 22% w/w phosphatidylethanolamine, about 12 to about 22% w/w sphingomyelin, and about 1 to about 3% w/w phosphatidylserine, or
s) about 75 to about 95% w/w lipid, about 50 to about 90% w/w phospholipid, about 10 to about 45% w/w phosphatidylcholine, about 12 to about 25% w/w phosphatidylethanolamine, about 12 to about 25% w/w sphingomyelin, about 1 to about 6% w/w phosphatidylserine, and about 0.5 to 4% w/w phosphatidylinositol, or
t) about 80 to about 90% w/w lipid, about 65 to about 75% w/w phospholipid, about 10 to about 30% w/w phosphatidylcholine, about 12 to about 22% w/w phosphatidylethanolamine, about 12 to about 22% w/w sphingomyelin, about 1 to about 3% w/w phosphatidylserine, and about 0.5 to 3% w/w phosphatidylinositol, or
u) about 25 to about 45% w/w lipid and about 0.2 to about 1% w/w ganglioside GD3, or
v) about 25 to about 45% w/w lipid, about 10 to about 30% w/w phospholipids, and about 0.2 to about 1% w/w ganglioside, or
w) about 25 to about 45% w/w lipid, about 10 to about 30% w/w phospholipids, about 2 to about 5% w/w phosphatidylcholine, about 3 to about 7% w/w phosphatidylethanolamine, about 2 to about 5% w/w sphingomyelin, about 2 to about 12% w/w phosphatidylserine, about 1 to about 5% w/w phosphatidylinositol, and about 0.2 to about 1% w/w ganglioside, or
x) about 20 to about 40% w/w lipid and about 0.8 to about 2% w/w ganglioside GD3, or
y) about 20 to about 40% w/w lipid, about 5 to about 30% w/w phospholipids, and about 0.8 to about 3.5% w/w ganglioside, or
z) about 20 to about 40% w/w lipid, about 5 to about 30% w/w phospholipids, about 1 to about 5% w/w phosphatidylcholine, about 2 to about 8% w/w phosphatidylethanolamine, about 0.5 to about 5% w/w sphingomyelin, about 1 to about 10% w/w phosphatidylserine, about 1 to about 6% w/w phosphatidylinositol, and about 0.8 to about 3.5% w/w ganglioside.

In various embodiments, the fraction may comprise at least about 30% total lipids, at least about 0.5% ganglioside GD3, and at least about 0.4% ganglioside GM3.

In another embodiment, the fraction comprises at least about 30% total lipids, at least about 1.2% ganglioside GD3, and at least about 0.2% ganglioside GM3.

In one embodiment a composition useful herein comprises, consists essentially of, or consists of at least about 0.1, 0.2, 0.5, 1, 5, 10, 15, 20, 25, 30, 35, 40, 45, 50, 55, 60, 65, 70, 75, 80, 85, 90, 95, 99, 99.5, 99.8 or 99.9% by weight of one or more lipid compositions described above and useful ranges may be selected between any of these foregoing values (for example, from about 0.1 to about 50%, from about 0.2 to about 50%, from about 0.5 to about 50%, from about 1 to about 50%, from about 5 to about 50%, from about 10 to about 50%, from about 15 to about 50%, from about 20 to about 50%, from about 25 to about 50%, from about 30 to about 50%, from about 35 to about 50%, from about 40 to about 50%, from about 45 to about 50%, from about 0.1 to about 60%, from about 0.2 to about 60%, from about 0.5 to about 60%, from about 1 to about 60%, from about 5 to about 60%, from about 10 to about 60%, from about 15 to about 60%, from about 20 to about 60%, from about 25 to about 60%, from about 30 to about 60%, from about 35 to about 60%, from about 40 to about 60%, from about 45 to about 60%, from about 0.1 to about 70%, from about 0.2 to about 70%, from about 0.5 to about 70%, from about 1 to about 70%, from about 5 to about 70%, from about 10 to about 70%, from about 15 to about 70%, from about 20 to about 70%, from about 25 to about 70%, from about 30 to about 70%, from about 35 to about 70%, from about 40 to about 70%, from about 45 to about 70%, from about 0.1 to about 80%, from about 0.2 to about 80%, from about 0.5 to about 80%, from about 1 to about 80%, from about 5 to about 80%, from about 10 to about 80%, from about 15 to about 80%, from about 20 to about 80%, from about 25 to about 80%, from about 30 to about 80%, from about 35 to about 80%, from about 40 to about 80%, from about 45 to about 80%, from about 0.1 to about 90%, from about 0.2 to about 90%, from about 0.5 to about 90%, from about 1 to about 90%, from about 5 to about 90%, from about 10 to about 90%, from about 15 to about 90%, from about 20 to about 90%, from about 25 to about 90%, from about 30 to about 90%, from about 35 to about 90%, from about 40 to about 90%, from about 45 to about 90%, from about 0.1 to about 99%, from about 0.2 to about 99%, from about 0.5 to about 99%, from about 1 to about 99%, from about 5 to about 99%, from about 10 to about 99%, from about 15 to about 99%, from about 20 to about 99%, from about 25 to about 99%, from about 30 to about 99%, from about 35 to about 99%, from about 40 to about 99%, and from about 45 to about 99%).

In one embodiment a composition useful herein comprises, consists essentially of, or consists of at least about 0.001, 0.01, 0.05, 0.1, 0.15, 0.2, 0.3, 0.4, 0.5, 1, 2, 3, 4, 5, 6, 7, 8, 9, 10, 11, 12, 13, 14, 15, 16, 17, 18 or 19 grams of one or more lipid compositions described above and useful ranges may be selected between any of these foregoing values (for example, from about 0.01 to about 1 grams, about 0.01 to about 10 grams, about 0.01 to about 19 grams, from about 0.1 to about 1 grams, about 0.1 to about 10 grams, about 0.1 to about 19 grams, from about 1 to about 5 grams, about 1 to about 10 grams, about 1 to about 19 grams, about 5 to about 10 grams, and about 5 to about 19 grams).

Compositions

A composition useful herein may be formulated as a food, drink, food additive, drink additive, dietary supplement, nutritional composition, medical food, enteral or parenteral feeding product, meal replacement, cosmeceutical, nutraceutical, or pharmaceutical. Appropriate formulations may be prepared by an art skilled worker with regard to that skill and the teaching of this specification.

In various embodiments, compositions useful herein may include any edible consumer product which is able to carry lipid. Examples of suitable edible consumer products include powders, liquids, confectionary products including chocolate, gels, ice creams, reconstituted fruit products, snack bars, food bars, muesli bars, spreads, sauces, dips, dairy products including yoghurts and cheeses, drinks including dairy and non-dairy based drinks (such as milk drinks and yogurt drinks), milk powders, sports supplements including dairy and non-dairy based sports supplements, food additives such as protein sprinkles, dietary supplement products including daily supplement tablets, weaning foods and yoghurts, and formulas such as maternal formulas, in powder or liquid form, including hypoallergenic embodiments of such compositions. Within this embodiment, a preferred composition useful herein may be a maternal formula, in powder or liquid form. Suitable nutraceutical compositions useful herein may be provided in similar forms.

Examples of formulas, in powder or liquid form, include the following. It should be understood that the following formulations are indicative only and variations may be made according to known principles for formulating such products. For example, non-dairy sources of protein may be supplemented for the dairy proteins listed. Equally, hypoallergenic embodiments of these products may be provided where the protein source is fully or partially hydrolysed. Such hydrolysates are known in the art.

One example of a maternal formula, useful herein comprises
a) from about 10 to about 30 g protein per 100 g,
b) from about 2 to about 10 g fibre per 100 g,
c) from about 1 to about 20 g fat per 100 g,
d) from about 30 to about 60 g carbohydrate per 100 g,
e) from about 50 to about 150 mg docosahexanoic acid per 100 g,
f) from about $1 \times 10^5$ to about $1 \times 10^{10}$ cfu probiotics,
g) from about 5 to about 15 mg pantothenic acid per 100 g,
h) from about 600 to about 900 pg DFE folate,
i) from about 300 to about 500 pg folic acid, and
j) vitamin and mineral premixes.

One example of an infant formula, useful herein comprises
a) from about 10 to about 15 g protein per 100 g,
b) from about 0.1 to about 4 g fibre per 100 g,
c) from about 20 to about 30 g fat per 100 g,
d) from about 22 g to about 60 g carbohydrate per 100 g,
e) a source of DHA,
f) a source of arachidonic acid,
g) from about $1 \times 10^5$ to about $1 \times 10^{10}$ cfu probiotics, and
h) vitamin and mineral premixes.

In one embodiment a composition useful herein comprises, consists essentially of, or consists of about 0.1, 0.5, 1, 5, 10, 15, 20, 25, 30, 35, 40, 45, 50, 55, 60, 65, 70, 75, 80, 85, 90, 95, 97, 99, or 99.9% by weight of fresh whole milk or a milk derivative and useful ranges may be selected between any of these foregoing values (for example, from about 0.1 to about 50%, from about 0.2 to about 50%, from about 0.5 to about 50%, from about 1 to about 50%, from about 5 to about 50%, from about 10 to about 50%, from about 15 to about 50%, from about 20 to about 50%, from about 25 to about 50%, from about 30 to about 50%, from about 35 to about 50%, from about 40 to about 50%, and from about 45 to about 50%). The milk derivative is preferably selected from recombined, powdered or fresh skim milk, recombined or reconstituted whole or skim milk powder, skim milk concentrate, skim milk retentate, concentrated milk, ultrafiltered milk retentate, milk protein concentrate (MPC), high fat MPC, milk protein isolate (MPI), calcium depleted milk protein concentrate (MPC), low fat milk, low fat milk protein concentrate (MPC), casein, caseinate, milk fat, cream, butter, ghee, anhydrous milk fat (AMF), buttermilk, butter serum, beta serum, hard milk fat fractions, soft milk fat fractions, sphingolipid fractions, milk fat globule membrane fractions, milk fat globule membrane lipid fractions, phospholipid fractions, complex lipid fractions, colostrum, a colostrum fraction, colostrum protein concentrate (CPC), colostrum whey, an immunoglobulin fraction from colostrum, whey (including sweet whey, lactic acid whey, mineral acid whey, or reconstituted whey powder), whey protein isolate (WPI), whey protein concentrate (WPC), whey cream, high fat whey, high fat WPC, a composition derived from any milk or colostrum processing stream, a composition derived from the retentate or permeate obtained by ultrafiltration or microfiltration of any milk or colostrum processing stream, a composition derived from the breakthrough or adsorbed fraction obtained by chromatographic (including but not limited to ion and gel permeation chromatography) separation of any milk or colostrum processing stream, extracts of any of these milk derivatives including extracts prepared by multistage fractionation, differential crystallisation, solvent fractionation, supercritical fractionation, near critical fractionation, distillation, centrifugal fractionation, or fractionation with a modifier (e.g. soaps or emulsifiers), hydrolysates of any of these derivatives, fractions of the hydrolysates, and any combination of any two or more of these derivatives, including combinations of hydrolysed and/or non-hydrolysed fractions. It should be understood that the source of these derivatives may be milk or colostrum or a combination thereof.

In one embodiment the composition comprises one or more non-polar milk lipids.

In various embodiments the composition comprises one or more glycerides (including one or more monoglycerides, one or more diglycerides, or one or more triglycerides, or any combination of any two or more thereof), one or more ceramides, one or more ether glycerophospholipids, one or more cerebrosides (including one or more glucosylceramides or one or more lactosylceramides, or combinations thereof), or one or more sulfatides, or any combination of any two or more thereof.

Formulas useful herein may also comprise 0.1 to 4% w/w, preferably 2 to 4% w/w of one or more of a vitamin premix, a mineral premix, lecithin, one or more antioxidants, one or more stabilisers, or one or more nucleotides, or a combination of any two or more thereof. In some embodiments, formulas may be formulated to provide about 1000 to about 2000 kJ/100 g, or about 2700 and about 3000 kJ/L.

Examples of edible consumer products of the invention, such as dairy based drinks (such as milk drinks and yogurt drinks) will typically comprise and may consist of a protein source (such as a dairy protein source), a lipid source, a carbohydrate source, in addition to the one or more polar lipids. Flavourants, colourants, and other additives, carriers or excipients as are well known to those skilled in the art may also be included.

A further example of an edible consumer product amenable to use in the present invention is the Unistraw™ delivery system (Unistraw International Limited, Australia) as described in PCT international application PCT/AU2007/000265 (published as WO 2007/098564) and PCT international application PCT/AU2007/001698 (published as WO 2008/055296), each incorporated herein in its entirety. It will be appreciated by those skilled in the art that one or more polar lipids may be coated onto a substrate (for example, a water soluble bead) for use in such delivery systems.

In alternative embodiments, the compositions useful herein may be formulated to allow for administration to a subject by any chosen route, including but not limited to oral or parenteral (including topical, subcutaneous, intramuscular and intravenous) administration.

For example, a nutraceutical composition for use according to the invention can be a dietary supplement (e.g., a capsule, a mini-bag, or a tablet) or a food product (e.g., milk, juice, a soft drink, an herbal tea-bag, or confectionary). The composition can also include other nutrients, such as a protein, a carbohydrate, vitamins, minerals, or amino acids. The composition can be in a form suitable for oral use, such as a tablet, a hard or soft capsule, an aqueous or oil suspension, or a syrup; or in a form suitable for parenteral use, such as an aqueous propylene glycol solution, or a buffered aqueous solution. The amount of the active ingredient in the nutraceutical composition depends to a large extent on a subject's specific need. The amount also varies, as recognized by those skilled in the art, dependent on administration route, and possible co-usage of other probiotic factors or probiotic agents.

It will be appreciated that in certain embodiments, the compositions of the invention may be formulated so as to have a desired calorific content, for example so as to deliver a desired amount of energy or a desired percentage of daily recommended energy intake. For example, an edible consumer product may be formulated to provide from about 200 to about 2000 kJ per serve, or from about 500 kJ to about 2000 kJ per serve, or from about 1000 to about 2000 kJ per serve.

Thus, a pharmaceutical composition useful according to the invention may be formulated with an appropriate pharmaceutically acceptable carrier (including excipients, diluents, auxiliaries, and combinations thereof) selected with regard to the intended route of administration and standard pharmaceutical practice. For example, a composition useful according to the invention can be administered orally as a powder, liquid, tablet or capsule, or topically as an ointment, cream or lotion. Suitable formulations may contain additional agents as required, including emulsifying, antioxidant, flavouring or colouring agents, and may be adapted for immediate-, delayed-, modified-, sustained-, pulsed- or controlled-release.

The term "pharmaceutically acceptable carrier" is intended to refer to a carrier including but not limited to an excipient, diluent or auxiliary, pharmaceutically acceptable carrier includes a solvent, a dispersion medium, a coating, an antibacterial and antifungal agent, and an isotonic and absorption delaying agent or combination thereof, that can be administered to a subject as a component of a composition described herein that does not reduce the activity of the composition and is not toxic when administered in doses sufficient to deliver an effective amount of a compound or composition useful herein. The formulations can be administered orally, nasally or parenterally (including topically, intramuscularly, intraperitoneally, subcutaneously and intravenously).

In certain embodiments, a composition of the invention (such as, for example, a nutraceutical or pharmaceutical composition of the invention, may be provided as a capsule. Capsules can contain any standard pharmaceutically acceptable materials such as gelatin or cellulose. Tablets can be formulated in accordance with conventional procedures by compressing mixtures of the active ingredients with a solid carrier and a lubricant. Examples of solid carriers include starch and sugar bentonite. Active ingredients can also be administered in a form of a hard shell tablet or a capsule containing a binder, e.g., lactose or mannitol, a conventional filler, and a tabletting agent. Pharmaceutical compositions can also be administered via the parenteral route. Examples of parenteral dosage forms include aqueous solutions, isotonic saline or 5% glucose of the active agent, or other well-known pharmaceutically acceptable excipients. Cyclodextrins, or other solubilising agents well-known to those familiar with the art, can be utilized as excipients for delivery of the therapeutic agent.

In various embodiments, methods useful herein may comprise separate, simultaneous, or sequential administration of, or compositions useful herein may comprise, one or more strains of probiotic bacteria or a derivative thereof, for example, *Lactobacillus rhamnosus* HN001 or a derivative thereof. Methods to produce such0 compositions are well-known in the art, and may utilise standard microbiological and pharmaceutical practices.

As used herein, the term "derivative" and grammatical equivalents thereof when used with reference to bacteria (including use with reference to a specific strain of bacteria such as *L. rhamnosus* HN001) contemplates mutants and homologues of or derived from the bacteria, killed or attenuated bacteria such as but not limited to heat-killed, lysed, fractionated, pressure-killed, irradiated, and UV- or light-treated bacteria, and material derived from the bacteria including but not limited to bacterial cell wall compositions, bacterial cell lysates, lyophilised bacteria, probiotic factors from the bacteria, and the like, wherein the derivative retains probiotic activity. Methods to produce such derivatives, such as but not limited to one or more mutants of *L. rhamnosus* HN001 or one or more probiotic factors, and particularly derivatives suitable for administration to a subject (for example, in a composition) are well-known in the art.

It will be appreciated that there are a wide variety of methods known and available to the skilled artisan that can be used to confirm the identity of a bacteria, such as *L. rhamnosus* HN001, wherein exemplary methods include DNA fingerprinting, genomic analysis, sequencing, and related genomic and proteomic techniques. It will be appreciated that such methods suitable for identifying a specific bacterium are similarly suitable for identifying derivatives of the bacterium, including for example mutants or homologues of the bacterium, or for example probiotic factors from the bacterium.

The term "probiotic factor" refers to a bacterial molecule responsible for mediating probiotic activity, including but not limited to bacterial DNA motifs, surface proteins, small organic acids, polysaccharides, or cell wall components such as lipoteichoic acids and peptidoglycan, or a mixture of any two or more thereof. Without wishing to be bound by any theory, such molecules will be present if a probiotic organism is present.

The term "probiotic activity" refers to the ability of certain microorganisms to stimulate the immune system. Measuring the type and level of activity of a probiotic microorganism is known to those skilled in the art. For example, probiotic activity may be assessed by a PBMC cytokine secretion assay.

Reference to retaining probiotic activity is intended to mean that a derivative of a probiotic microorganism, such as a mutant or homologue of a probiotic microorganism or an attenuated or killed probiotic microorganism still has useful probiotic activity, or that a composition comprising a probiotic microorganism or a derivative thereof is capable of supporting the maintenance of useful probiotic activity.

While the bacterial molecules responsible for mediating probiotic activity have not been clearly identified, molecules that have been proposed as possible candidates include bacterial DNA motifs, surface proteins, small organic acids, polysaccharides, and cell wall components such as lipoteichoic acids and peptidoglycan. It has been postulated that these interact with components of the host immune system to give an immuno-modulatory effect. Preferably, the retained activity is at least about 35, 40, 45, 50, 55, 60, 65, 70, 75, 80, 85, 90, 95, 99 or 100% of the activity of an untreated (i.e., live or non-attenuated) control, and useful ranges may be selected between any of these values (for example, from about 35 to about 100%, from about 50 to about 100%, from about 60 to about 100%), from about 70 to about 100%, from about 80 to about 100%, and from about 90 to about 100%).

In certain embodiments, one or more strains of probiotic bacteria may be provided at a concentration sufficient to supply an efficacious dose. Exemplary non-limiting concentrations include from about $5 \times 10^5$ cfu per gram of composition to about $10^9$ cfu per gram of composition, or from about $10^6$ cfu per gram of composition to about $10^8$ cfu per gram of composition.

In one embodiment a composition useful herein may comprise, consist essentially of, or consist of at least about 0.1, 0.2, 0.5, 1, 5, 10, 15, 20, 25, 30, 35, 40, 45, 50, 55, 60, 65, 70, 75, 80, 85, 90, 95, 99, 99.5, 99.8 or 99.9% by weight of one or more strains of probiotic bacteria or a derivative thereof and useful ranges may be selected between any of these foregoing values (for example, from about 0.1 to about 50, about 0.2 to about 50, about 0.5 to about 50, about 1 to about 50, about 5 to about 50, about 10 to about 50, about 15 to about 50, about 20 to about 50, about 25 to about 50, about 30 to about 50, about 35 to about 50, about 40 to about 50, about 45 to about 50, about 0.1 to about 60, about 0.2 to about 60, about 0.5 to about 60, about 1 to about 60, about 5 to about 60, about 10 to about 60, about 15 to about 60, about 20 to about 60, about 25 to about 60, about 30 to about 60, about 35 to about 60, about 40 to about 60, about 45 to about 60, about 0.1 to about 70, about 0.2 to about 70, about 0.5 to about 70, about 1 to about 70, about 5 to about 70, about 10 to about 70, about 15 to about 70, about 20 to about 70, about 25 to about 70, about 30 to about 70, about 35 to about 70, about 40 to about 70, about 45 to about 70, about 0.1 to about 80, about 0.2 to about 80, about 0.5 to about 80, about 1 to about 80, about 5 to about 80, about 10 to about 80, about 15 to about 80, about 20 to about 80, about 25 to about 80, about 30 to about 80, about 35 to about 80, about 40 to about 80, about 45 to about 80, about 0.1 to about 90, about 0.2 to about 90, about 0.5 to about 90, about 1 to about 90, about 5 to about 90, about 10 to about 90, about 15 to about 90, about 20 to about 90, about 25 to about 90, about 30 to about 90, about 35 to about 90, about 40 to about 90, about 45 to about 90, about 0.1 to about 99, about 0.2 to about 99, about 0.5 to about 99, about 1 to about 99, about 5 to about 99, about 10 to about 99, about 15 to about 99, about 20 to about 99, about 25 to about 99, about 30 to about 99, about 35 to about 99, about 40 to about 99, and about 45 to about 99%).

It will be appreciated that a broad range of additives or carriers may be included in compositions useful herein, for example to improve or preserve bacterial viability. For example, additives such as surfactants, wetters, humectants, stickers, dispersal agents, stabilisers, penetrants, and so-called stressing additives to improve bacterial cell vigor, growth, replication and survivability (such as potassium chloride, glycerol, sodium chloride and glucose), as well as cryoprotectants such as maltodextrin, may be included. Additives may also include compositions which assist in maintaining microorganism viability in long term storage, for example unrefined corn oil, or "invert" emulsions containing a mixture of oils and waxes on the outside and water, sodium alginate and bacteria on the inside.

Compositions useful herein may comprise a carbohydrate source, such as a disaccharide including, for example, sucrose, fructose, glucose, or dextrose. Preferably the carbohydrate source is one able to be aerobically or anaerobically utilised by probiotic bacteria.

In various embodiments, methods useful herein may comprise separate, simultaneous, or sequential administration of, or compositions useful herein may comprise, a probiotic and a prebiotic, for example fructooligosaccharides, galactooligosaccharides, human milk oligosaccharides and combinations thereof.

The efficacy of compositions useful herein can be evaluated both in vitro and in vivo. See, for example, the examples below. Briefly, the composition can be tested for its ability to prevent or treat GDM, or to modulate glucose tolerance. For in vivo studies, the composition can be fed to or injected into an animal model (e.g., a mouse) or administered to human subjects (including pregnant women) and its effects on incidence and severity of GDM or glucose tolerance and associated conditions are then assessed. Based on the results, an appropriate dosage range and administration route can be determined.

It will be appreciated that preferred compositions are formulated to provide an efficacious dose of one or more polar lipids in a convenient form and amount. In certain embodiments, such as but not limited to those where periodic dose need not vary with body weight or other characteristics of the subject, the composition may be formulated for unit dosage. It should be appreciated that administration may include a single daily dose or administration of a number of discrete divided doses as may be appropriate. For example, an efficacious dose of one or more polar lipids may be formulated into a capsule for oral administration. In another embodiment an efficacious dose of one or more polar lipids may be provided in one or more serves of a powdered formula reconstituted in water or other liquid, as described in the Example below.

However, by way of general example, the inventors contemplate administration of from about 1 mg to about 1000 mg per kg body weight of a composition useful herein per day, preferably about 50 to about 500 mg per kg per day, alternatively about 150 to about 410 mg/kg/day or about 110 to about 310 mg/kg/day. In various embodiments, the inventors contemplate administration of from about 0.05 mg to about 250 mg per kg body weight of a composition useful herein.

Examples of infant formula, follow-on formula, or growing-up formula are presented herein. Compositions such as these may be formulated so that the concentration of the one or more polar lipids present in the composition is such that an efficacious dose can be prepared using a readily measurable amount of the composition. For example, in certain embodiments, such as for example where the composition is an infant formula, the one or more polar lipids is provided at a concentration sufficient to supply an efficacious dose in an amount of formula capable of being easily measured by a parent or caregiver when preparing the formula for administration, such as, for example, with a measured scoop or similar as are commonly provided with infant formulas.

The compositions useful herein may be used alone or in combination with one or more other therapeutic agents. The therapeutic agent may be a food, drink, food additive, drink additive, food component, drink component, dietary supplement, nutritional composition, medical food, nutraceutical, medicament or pharmaceutical. The therapeutic agent may be effective to treat, prevent or attenuate GDM or one or more of the symptoms of GDM, or one or more GDM-associated risks or one or more sequelae of GDM.

When used in combination with another therapeutic agent, the administration of a composition useful herein and the other therapeutic agent may be simultaneous or sequential. Simultaneous administration includes the administration of a single dosage form that comprises all components or the administration of separate dosage forms at substantially the same time. Sequential administration includes administration according to different schedules, preferably so that there is an overlap in the periods during which the composition useful herein and another therapeutic agent are provided.

Suitable agents with which the compositions useful herein can be separately, simultaneously or sequentially administered include one or more probiotic agents, one or more prebiotic agents, other suitable agents known in the art, and combinations thereof. Useful prebiotics include galactooligosaccharides (GOS), short chain GOS, long chain GOS, fructooligosaccharides (FOS), human milk oligosaccharides (HMO), short chain FOS, long chain FOS, inulin, galactans, fructans, lactulose, and any mixture of any two or more thereof. Some prebiotics are reviewed by Boehm G and Moro G (Structural and Functional Aspects of Prebiotics Used in Infant Nutrition, J. Nutr. (2008) 138(9):1818S-1828S), incorporated herein by reference. Other useful agents may include dietary fibre such as a fully or partially insoluble or indigestible dietary fibre.

In various embodiments, a composition useful herein includes or is administered simultaneously or sequentially with milk components such as whey protein, whey protein fractions (including acidic or basic whey protein fractions or a combination thereof), glycomacropeptide, lactoferrin, iron-lactoferrin, a functional lactoferrin variant, a functional lactoferrin fragment, a vitamin D or calcium, or combinations thereof. Useful milk component-containing compositions include compositions such as a food, drink, food additive, drink additive, dietary supplement, nutritional composition, medical food or nutraceutical. Milk fractions enriched for these components may also be employed. Useful lactoferrins, fragments and compositions are described in international patent applications WO 03/082921 and WO 2007/043900, both incorporated herein by reference in their entirety.

It should be understood that the additional therapeutic agents listed above (both food based and pharmaceutical agents) may also be employed in a method according to the invention where they are administered separately, simultaneously or sequentially with a composition useful herein.

In various embodiments a composition useful herein may comprise a pharmaceutically acceptable carrier. In various embodiments the composition may be or may be formulated as a food, drink, food additive, drink additive, dietary supplement, nutritional composition, medical food, enteral feeding product, parenteral feeding product, meal replacement, cosmeceutical, nutraceutical, medicament, or pharmaceutical. In one embodiment the composition is in the form of a tablet, a caplet, a pill, a hard or soft capsule or a lozenge. In one embodiment the composition is in the form of a cachet, a powder, a dispensable powder, granules, a suspension, an elixir, a liquid, or any other form that can be added to food or drink, including for example water, milk or fruit juice. In one embodiment the composition further comprises one or more constituents (such as antioxidants) which prevent or reduce degradation of the composition during storage or after administration. These compositions may include any edible consumer product which is able to carry bacteria or bacterial derivatives, including heat-killed, pressure-killed, lysed, UV- or light-treated, irradiated, fractionated or otherwise killed or attenuated bacteria. Examples of suitable edible consumer products include aqueous products, baked goods, confectionary products including chocolate, gels, ice creams, reconstituted fruit products, snack bars, food bars, muesli bars, spreads, sauces, dips, dairy products including yoghurts and cheeses, drinks including dairy and non-dairy based drinks, milk, milk powders, sports supplements including dairy and non-dairy based sports supplements, fruit juice, food additives such as protein sprinkles, dietary supplement products including daily supplement tablets, weaning foods and yoghurts, and formulas such as infant formula, follow-on formula, or growing-up formula, in powder or liquid form. Suitable nutraceutical compositions useful herein may be provided in similar forms.

It will be appreciated that different compositions of the invention may be formulated with a view to administration to a particular subject group. For example, the formulation of a composition suitable to be administered to a pregnant mother (for example, for indirect administration to a foetal subject or to a breastfeeding neonatal, infant, or child subject) may differ to that of a composition to be directly administered to the subject. It should also be appreciated that the formulation of a composition to be administered prophylactically may differ to that of a composition formulated for administration once GDM or one or more symptoms of GDM is present.

Gestational Diabetes Mellitus

Accompanying the worldwide trends in obesity, the rate of gestational diabetes mellitus (GDM) is also increasing in both the developed and the developing world. GDM generally affects between 9% and 26% of all pregnancies depending on country and ethnic group. In certain cases the prevalence of GDM is as high as 36%. Using the IADPSG diagnostic criteria, 18% of pregnant women in the United States develop GDM during pregnancy. There is a strong trend for increasing prevalence over the past 20 years.

GDM is associated with short and long-term adverse outcomes for both women and infants, including maternal gestational hypertension, polyhydramnios, preeclampsia, delivery of large-for-gestation infants, instrumental or caesarean delivery, and maternal death.

Adverse infant outcomes include preterm birth, shoulder dystocia, macrosomia, congenital defects, and neonatal complications such as hypoglycaemia, jaundice and respiratory distress. In addition, in the longer term, women with GDM are at increased risk of metabolic syndrome, type 2 diabetes, and cardiovascular disease. Offspring of women with GDM have an increased risk of diabetes, obesity and metabolic issues with evidence of altered insulin secretion and lipid profiles regardless of the infant's weight.

Lifestyle interventions to prevent GDM relating to diet, weight loss and exercise are often unsuccessful; therefore primary prevention of GDM could provide substantial multigenerational health and economic benefits.

Various aspects of the invention will now be illustrated in non-limiting ways by reference to the following examples.

EXAMPLE

The purpose of this example was to investigate the effect of compositions of the invention on gestational diabetes.

Methods

A total of 1,000 women were recruited from maternity clinics in the Chongqing municipality of China between 11 and 14 weeks of pregnancy. Eligible gravidas were aged 20 to 40 years and had a singleton pregnancy. Women with a history of premature delivery before 32 weeks, known milk allergy or aversion, or lactose intolerance were excluded.

The participants were randomized into one of two treatment groups (500 participants per group):

Standard group: standard maternal milk formulation.

Intervention group: complex milk lipid-enhanced (CML-E) maternal milk formulated to provide an enhanced level of polar lipids including gangliosides (Fonterra Co-operative Limited, New Zealand).

The composition of the standard maternal milk and CML-E milk formulations is shown in Table 2. Daily intake was two serves comprising 37.5 g formula reconstituted in 200 mL water.

TABLE 2

Composition of products A and B

| Nutrient per day (2 × 37.5 g serves) | Standard maternal milk | CML-E milk |
|---|---|---|
| Energy (kJ) | 1268 | 1268 |
| Protein (g) | 17.4 | 17.4 |
| Carbohydrate (g) | 35.4 | 35.4 |
| Prebiotics (inulin) (g) | 5 | 5 |
| Fat (g) | 9 | 9 |
| Docosahexaenoic acid (mg) | 50 | 50 |
| Polar lipid (Gangliosides) (Phospholipids) (mg) | 126 (7.7) (118.5) | 296 (15.4) (281.3) |
| Probiotics* (cfu) (*Bifidobacterium lactis* HN019, DR10) | $1.05 \times 10^7$ | $1.05 \times 10^7$ |
| Calcium (mg) | 1000 | 1000 |
| Magnesium (mg) | 150 | 150 |
| Iron (mg) | 15 | 15 |
| Zinc (mg) | 9.4 | 9.4 |
| Sodium (mg) | 204 | 204 |
| Vitamin A (µg) | 450 | 450 |
| Vitamin D (µg) | 5 | 5 |
| Vitamin E (mg) | 8 | 8 |
| Thiamin (mg) | 0.8 | 0.8 |
| Riboflavin (mg) | 1.4 | 1.4 |
| Folate (µg DFE) | 676 | 676 |
| Folic acid (µg) | 400 | 400 |
| Vitamin B12 (µg) | 2.6 | 2.6 |
| Vitamin B6 (mg) | 1.2 | 1.2 |
| Vitamin C (mg) | 79 | 79 |
| Pantothenic acid (mg) | 5.2 | 5.2 |
| Niacin | 6 | 6 |

All participants received standard pregnancy care through the First Affiliated Hospital of Chongqing Medical University.

Assessment

Women were assessed three times during pregnancy: at 11-14 weeks (enrolment), at 22-28 weeks and at 32-34 weeks at the First Affiliated Hospital of Chongqing Medical University. An oral glucose tolerance test was performed at 22-28 weeks. Gestational diabetes was diagnosed based on the 75 g oral glucose tolerance test according to the IADPSG and WHO criteria, defined by one of the following: fasting glucose≥5.1 mmol/l, 60 minute glucose≥10 mmol/l, or 120 minute glucose≥8.5 mmol/l (Lapolla et al., New International Association of the Diabetes and Pregnancy Study Groups (IADPSG) recommendations for diagnosing gestational diabetes compared with former criteria: a retrospective study on pregnancy outcome. Diabet Med. 2011; 28(9): 1074-7; World Health Organization. Diagnostic criteria and classification of hyperglycaemia first detected in pregnancy 2013 [17/06/2016]. Available from: http://apps.who.int/iris/bitstream/10665/85975/1/WHO_NMH_MND_13.2_eng.pdf).

Results

The results of the oral glucose tolerance testing are shown in Table 3 and discussed below. The risk of gestational diabetes with CML-E milk supplementation was lower than the risk with a standard maternal milk.

TABLE 3

Results of oral glucose tolerance testing

| Relative risks | Standard maternal Milk | CML-E milk | CML-E vs Standard |
|---|---|---|---|
| Gestational diabetes | 135 (30.8%) | 106 (24.5%) | 0.80 (0.64-0.99)* |
| Fasting glucose ≥5.1 mmol/l | 72 (16.4%) | 51 (11.8%) | 0.72 (0.51-1.00) |
| 60-min glucose ≥10 mmol/l | 56 (12.8%) | 49 (11.3%) | 0.89 (0.62-1.27) |
| 120-min glucose ≥8.5 mmol/l | 74 (16.9%) | 55 (12.7%) | 0.75 (0.55-1.04) |

Measured during a 75-g oral glucose tolerance test. Gestational diabetes defined by one of the following: fasting glocuse ≥5.1 mmol/l, 60-min glucose ≥10 mmol/l, or 120-min glucose ≥8.5 mmol/l.

Maternal age, BMI, and previous pregnancy are all predisposing factors towards the risk of gestational diabetes mellitus. Statistical analysis was done using binary logistic regression. Mothers with a BMI>25 (overweight and obese) receiving the CML-E milk showed a significant 53% reduction (from 69.6%±7.6% to 32.7±7.2% (mean±SEM)) in the risk of gestational diabetes (P=0.018) compared to the standard milk. For mothers with a BMI<25 there was no significant difference between the groups in the risk of gestational diabetes but in both groups the risk of gestational diabetes was significantly lower in mothers with a BMI<25 compared to mothers with a BMI>25. Mothers over the age of 30 years receiving CML-E showed a significant 49% reduction (59.7±5.8% to 30.3±5.1% (mean±SEM)) in the risk of gestational diabetes (p=0.004) compared to the group receiving the standard milk. There were no significant differences in the under 30 years of age women. Mothers having had one or more previous child receiving CML-E showed a 49% reduction (from 60.4±6.4% to 30.7±5.6% (mean±SEM)) in the risk of gestational diabetes (p=0.001) compared to the group receiving the standard milk. In mothers on bearing their first child, receiving CML-E there was a significant 42% reduction (from 45.1±5.1% to 26.0±3.9% (mean±SEM)) in the risk of gestational diabetes (P=0.003) compared to the standard milk.

INDUSTRIAL APPLICABILITY

This invention relates to the use of polar lipids, particularly polar lipids obtained from bovine milk fat, and in particular in the treatment or prevention of GDM. Methods for using the polar lipids and compositions comprising the polar lipids are also provided.

REFERENCES

Bylund, G. (Ed.) Dairy processing handbook. 1995 Tetra Pak Processing Systems AB, S-221 86 Lund, Sweden.

Fox P F, McSweeney P L H (eds), Advanced Dairy Chemistry, Volume 2—Lipids, 3rd Ed, Springer Science+Business Media, Inc., 2006.

Illingworth, D., Fractionation of fats. In Physical Properties of Lipids (Marangoni A G & Narine S, Eds), pp. 411-448. Marcel Dekker, New York (2002).

Kanno C & Dong-Hyun K (1990). A simple procedure for the preparation of bovine milk fat globule membrane and a comparison of its composition, enzymatic activity, and electrophoretic properties with these prepared by other methods. Agric. Biol. Chem., 54(11):2845-2854.

Kanno C, Shimizu M & Yamachi K (1975). Isolation and physiochemical properties of a soluble glycoprotein fraction of milk fat globule membrane. Agric. Biol. Chem., 39(9):1835-1842.

Pruthi T D, Narayanan K M & Bhaleerao V R (1970). The role of milk phospholipids in the autoxidation of butterfat—I. Indian Journal of Dairy Science, 23:248-251.

Rombaut R, Camp J V, Dewettinck K. Analysis of phospho- and sphingolipids in dairy products by a new HPLC method. J Dairy Sci. 2005 February; 88(2):482-8.

Rombaut R, Dejonckheere V, Dewettinck K., Microfiltration of butter serum upon casein micelle destabilization. J Dairy Sci. (2006)(a) 89(6):1915-25.

Rombaut R., Van Camp J. & Dewettinck K., Phospho- and sphingolipid distribution during processing of milk, butter and whey, International Journal of Food Science & Technology, (2006)(b) 41(4):435-443.

The invention claimed is:

1. A method of reducing the risk of gestational diabetes mellitus (GDM) in a pregnant subject in need thereof comprising:
   administering daily at least 0.2 g of polar lipids derived from non-human mammalian milk for a minimum period of from 14 weeks to 22 weeks gestation, wherein the polar lipids comprise one or more phospholipids and one or more gangliosides.

2. The method of claim 1, wherein the polar lipids are administered in a composition comprising at least 1.5% by weight polar lipids relative to total lipids.

3. The method of claim 1, wherein the polar lipids, phospholipids and gangliosides are derived from bovine milk.

4. The method of claim 1, wherein the method comprises administering to the subject at least 10 mg of the one or more gangliosides derived from non-human mammalian milk per day.

5. The method of claim 1, wherein the one or more polar lipids are administered in a composition comprising a physiologically acceptable diluent, adjuvant, carrier or excipient.

6. The method of claim 1, wherein the one or more polar lipids are administered in a composition comprising, or in the form of, a food.

7. The method of claim 6, wherein the food is selected from cultured milk, yoghurt, cheese, milk drink and milk powder.

8. The method of claim 1, wherein the one or more polar lipids are administered in:
   a. a composition that is a maternal formula or a maternal supplement, or
   b. a composition that is a supplement or nutritional composition, optionally a formula, a dietetic product, or food.

9. The method of claim 1, wherein the one or more gangliosides comprises GD3, GM3 or a combination thereof; or wherein the one or more phospholipids comprises one or more phosphatidylcholines, one or more phosphatidylinositols, one or more phosphatidylserines, one or more lysophospholipids, one or more phosphatidylethanolamines, one or more sphingomyelins, one or more dihydrosphingomyelins, one or more glycerolphospholipids, phosphatidylglycerol, or a combination of any two or more thereof.

10. The method of claim 1, wherein the subject:
   a. has an increased risk of GDM,
   b. has previously suffered GDM,
   c. is over the age of 35 years,
   d. has previously been pregnant, or
   e. any combination of any two or more of a) to d).

11. The method of claim 1, wherein the subject has high blood pressure.

12. The method of claim 1, wherein the method comprises administration of milk fat globule membrane material comprising the one or more polar lipids.

13. The method of claim 1, wherein the method further comprises separate, simultaneous, or sequential administration of a probiotic, wherein the probiotic comprises *Lactobacillus rhamnosus* HN001.

14. The method of claim 1 wherein administration is continued daily throughout gestation.

* * * * *